United States Patent [19]
Wang

[11] Patent Number: 5,438,936
[45] Date of Patent: Aug. 8, 1995

[54] CLAMPING TABLE FOR AUTOMOBILES

[76] Inventor: Chin-Yang Wang, No. 167, Lane 131, Sec. 2, True Hsing Rd., Panchiao, Taipei,

[21] Appl. No.: 154,861

[22] Filed: Nov. 19, 1993

[51] Int. Cl.[6] ............................................ A47B 23/00
[52] U.S. Cl. ...................................... 108/44; 108/55.1
[58] Field of Search ............... 108/44, 45, 55.3, 55.1, 108/42, 50; 248/638, 660

[56] References Cited
U.S. PATENT DOCUMENTS

| | | | |
|---|---|---|---|
| 3,026,159 | 3/1962 | Miller et al. | 108/44 X |
| 3,391,960 | 7/1969 | Megargle et al. | 108/44 X |
| 3,592,144 | 7/1971 | Futrell | 108/44 |
| 4,846,382 | 7/1989 | Foultner et al. | 108/45 X |

*Primary Examiner*—Jose V. Chen
*Attorney, Agent, or Firm*—Bucknam and Archer

[57] ABSTRACT

A clamping table includes two symmetrical clamping plates retained between a top shell and a bottom shell and having a respective rack, a transmission gear meshed between the racks, a racket mounted on the gear shaft of the transmission gear, a stop bar and a brake bar controlled to release the ratchet, and compression springs stopped against one clamping plate, wherein the clamping plates are moved apart by the compression springs when the brake bar is pressed to release a pawl thereof from the ratchet.

2 Claims, 4 Drawing Sheets

CLAMPING TABLE FOR AUTOMOBILES

BACKGROUND OF THE INVENTION

The present invention relates to a clamping table designed for use in automobiles for holding things.

In recent years, automobiles have become more and more popular. People may expend a lot of time in driving a car every day. Because of limited space, little room is provided within the instrument panel of an automobile for keeping things. Therefore, when one is driving a car, one's personal belongs may be put here and there disorderly within the car.

SUMMARY OF THE INVENTION

The present invention has been accomplished under the aforesaid circumstances. It is therefore an object of the present invention to provide a clamping table for automobiles which can be conveniently operated to hold things in place. It is another object of the present invention to provide a clamping table which can be conveniently installed in an automobile for holding things. It is still another object of the present invention to provide a clamping table which absorbs shocks.

According to the preferred embodiment of the present invention, the clamping table is comprised of a clamping table body mounted on the resilient stand having a bottom mount for mounting within a car. The clamping table body is comprised of a bottom shell, a bottom plate fastened to the stand to support a bottom shell by springs, a top shell covered on the bottom shell to hold two symmetrical clamping plates, two compression springs, a transmission gear, a ratchet, a stop bar, and a brake bar, wherein when the stop bar is pressed inwards, the brake bar is released from the ratchet causing the clamping plates to be moved apart by the compression springs; moving the clamping plates toward each other causes the ratchet to rotate over the brake bar and then immediately be stopped in position by the brake bar as the push force is released.

DETAILED DESCRIPTION OF THE PREFERRED EMBODIMENT

Figure 1:
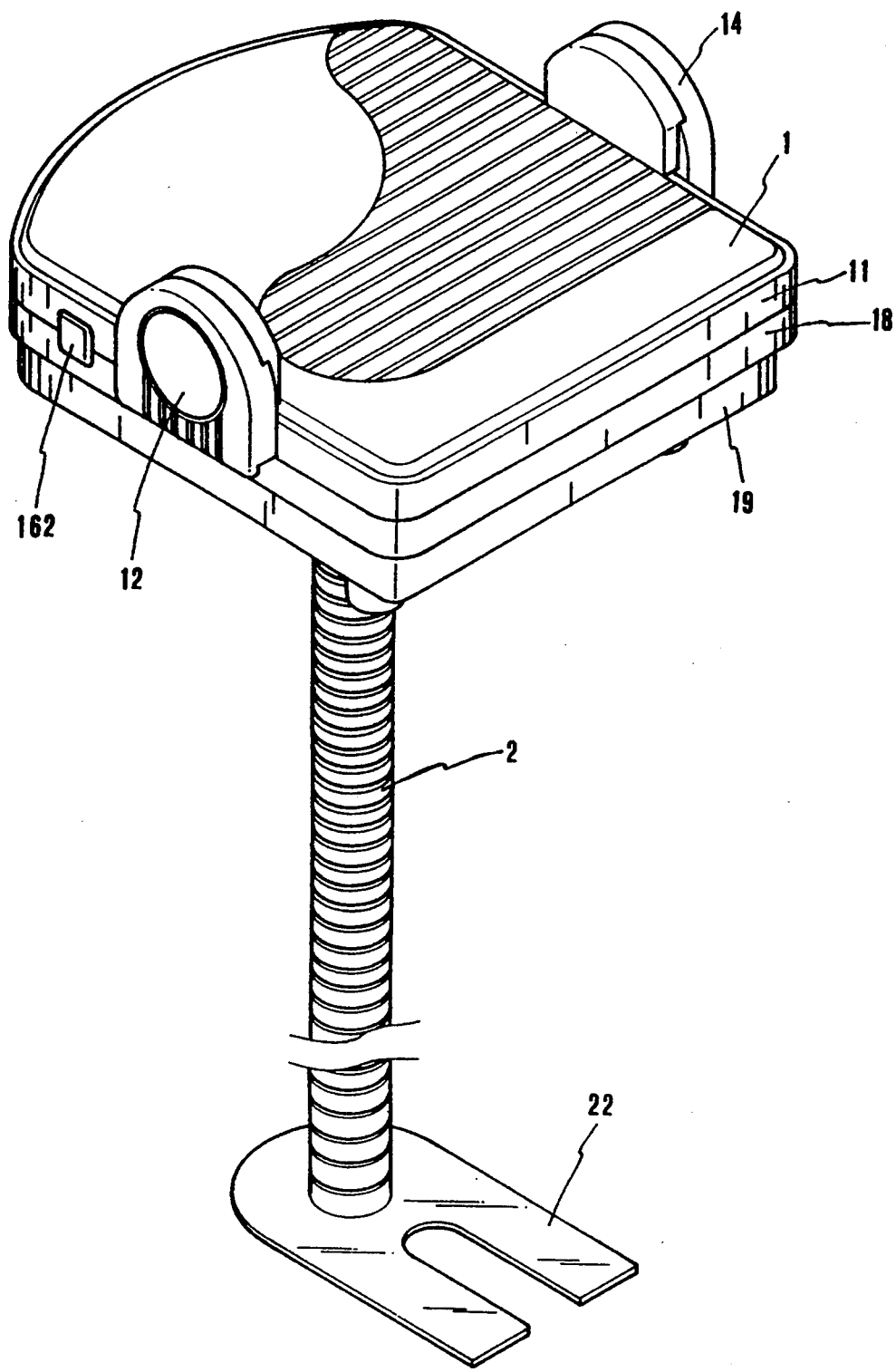
FIG. 1 is an elevational view of a clamping table according to the preferred embodiment of the present invention.

Referring to FIG. 1, a clamping table in accordance with the preferred embodiment of the present invention is generally comprised of a clamping table body 1 and a stand 2.

Figure 2:
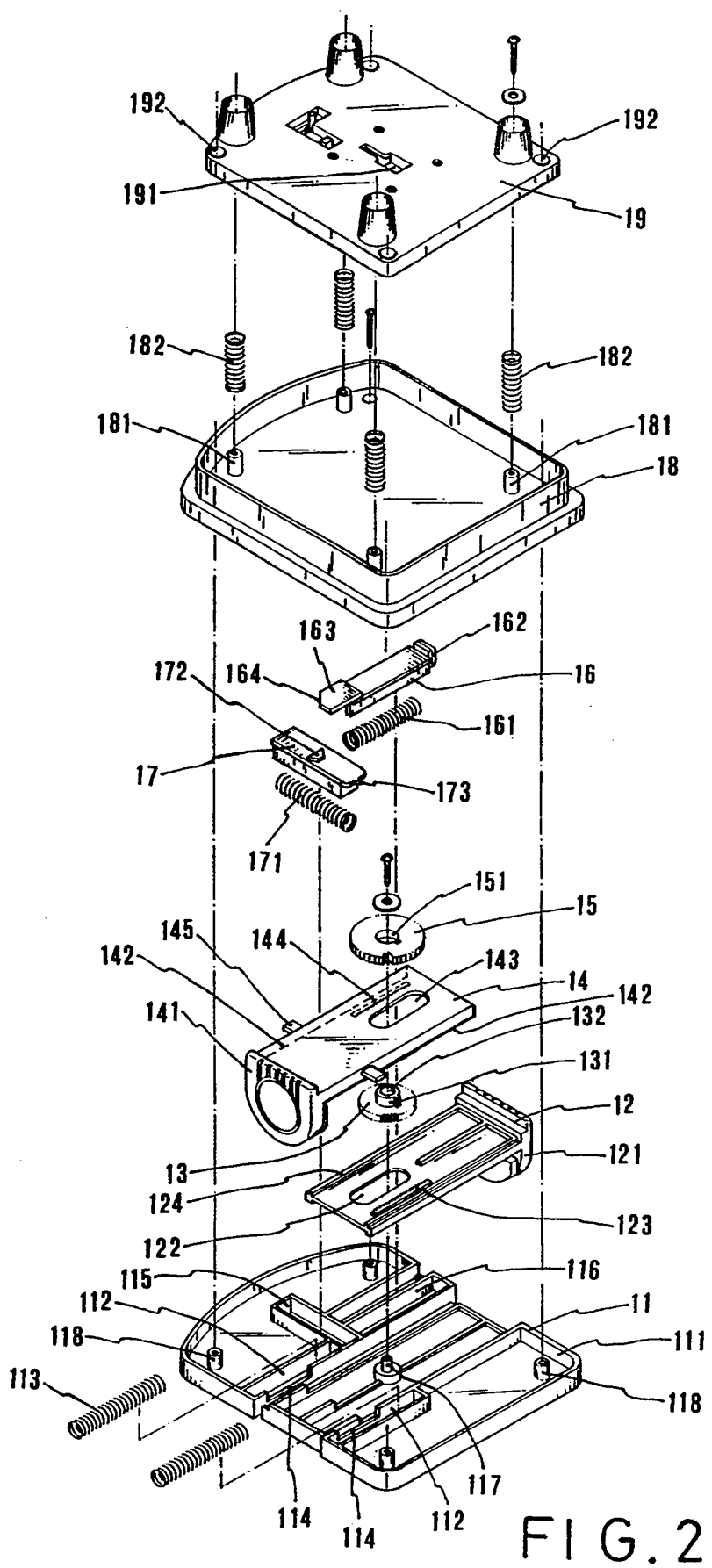
FIG. 2 is an exploded view of the clamping table shown in FIG. 1.

Referring to FIG. 2, the clamping table body 1 is comprised of a top shell 11, a first clamping plate 12, a transmission gear 13, a second clamping plate 14, a ratchet 15, a stop bar 16, a brake bar 17, a bottom shell 18, and a bottom plate 19. The top shell 11 is integrally made of flat shape comprising a vertical flange 111 raised around the border thereof, two parallel spring chambers 112, two compression springs 113 respectively disposed in either spring chamber 112, a sliding seat 114 formed between the two parallel spring chambers 112 for sliding the second clamping plate 14, a first trough 115 and a second trough 116 disposed at one side at right angles, a center shaft 117, which holds the transmission gear 13, and a plurality of internally threaded mounting rods 118 for mounting the casing 18 and the bottom plate 19. The first clamping plate 12 is made of flat shape comprising an end block 121 perpendicularly disposed at one end thereof, an oblong slot 122 near an opposite end thereof, through which the center shaft 117 passes, a rack 123 and an elongated rail 124 longitudinally disposed at two opposite sides by the oblong slot 122. The transmission gear 13 comprises a gear shaft 131 having a center through hole 132. Through the center through hole 132, the transmission gear 13 is mounted on the center shaft 117 and supported on the first clamping plate 12 and meshed with the rack 123 of the first clamping plate 12. The second clamping plate 14 is made symmetrical to the first clamping plate 12, comprising an end block 141 perpendicularly disposed at one end thereof opposite to the end block 121 of the first clamping plate 12, an oblong slot 143 near an opposite end thereof, through which the gear shaft 131 passes, two parallel rails 142 respectively and bilaterally stopped against the rack 123 and the rail 124 of the first clamping plate 12 on the outside, a rack 144 meshed with the transmission gear 13, and two side wings 145 mounted on the sliding seat 114 and respectively stopped against the compression springs 113 at one end. The ratchet 15 is supported on the second clamping plate 14, having a center through hole 151 mounted on the gear shaft 131 of the transmission gear 13. The stop bar 16 is made in the shape of an open frame to hold a spring 161 within the second trough 116, having a rear end terminated to a finger strip 162 extended out of the clamping table body 1 and an opposite end terminated by a projecting strip 163 with a chamfered edge 164. The brake bar 17 is made in the-shape of a trapezoidal open frame to hold a spring 171 within the first trough 115, having a stop wedge 172 stopped against the chamfered edge 164 of the projecting strip 163 of the stop bar 16 and a pawl 173 engaged into the teeth of the ratchet 15. The bottom shell 18 comprises a plurality of upright posts 181 to hold a respective spring 182. The bottom plate 19 comprises a center mounting hole 191 for mounting the stand 2, a plurality of mounting holes 192 respectively connected to respective through holes (not shown) on the bottom shell 18 and the internally threaded mounting rods 118 on the top shell 11 by screws. The stand 2 is made of a resilient material having a top support 21 (not shown) at the top fastened to the mounting hole 191 on the bottom plate 19, and a bottom mount 22 for fastening to the bottom frame of a motor vehicle. When assembled, the springs 182 are retained between the bottom plate 19 and the bottom shell 18 to absorb or lessen shocks.

Figure 3:
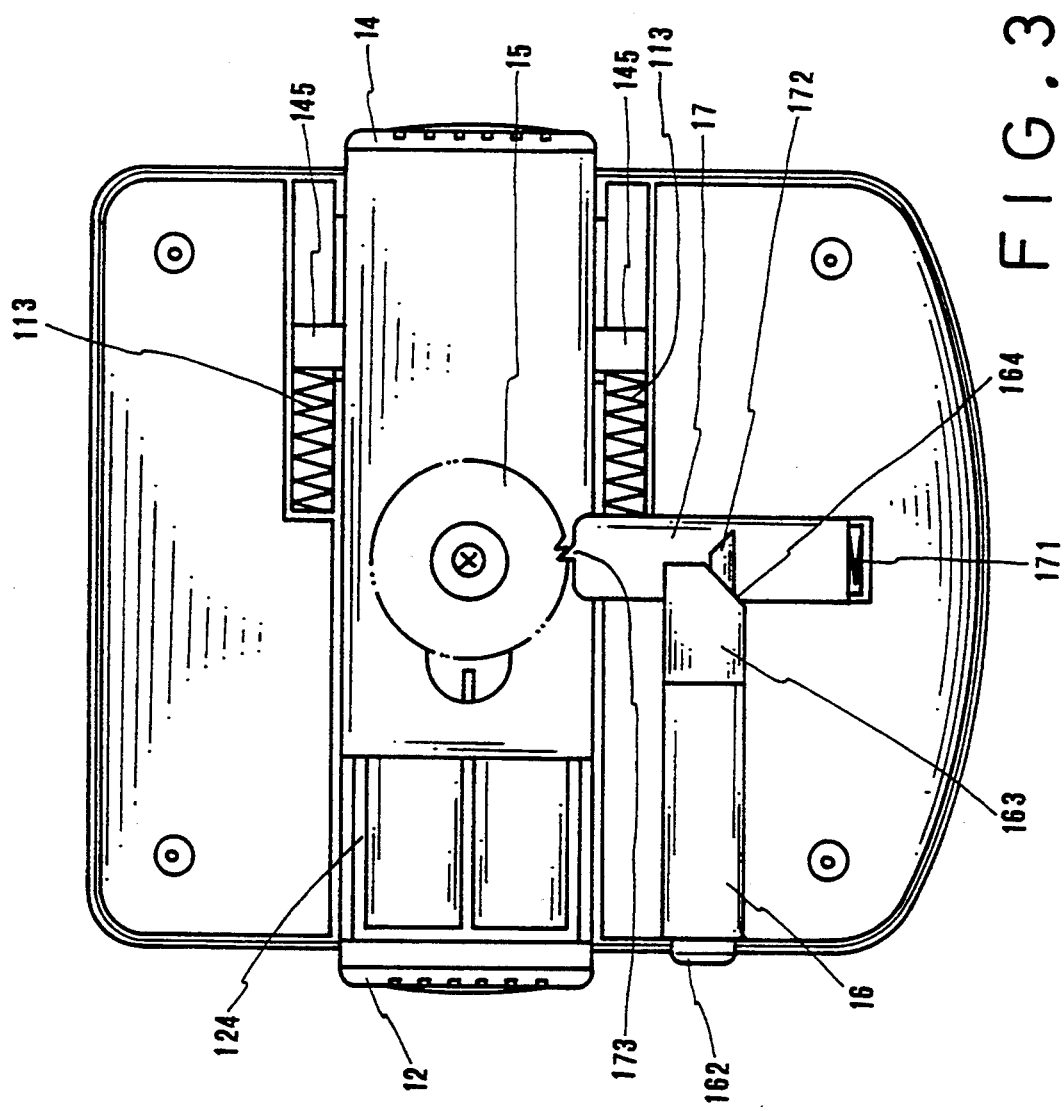
FIG. 3 is a plain view of the clamping table body of the clamping table showing the compression springs compressed.
Figure 4:
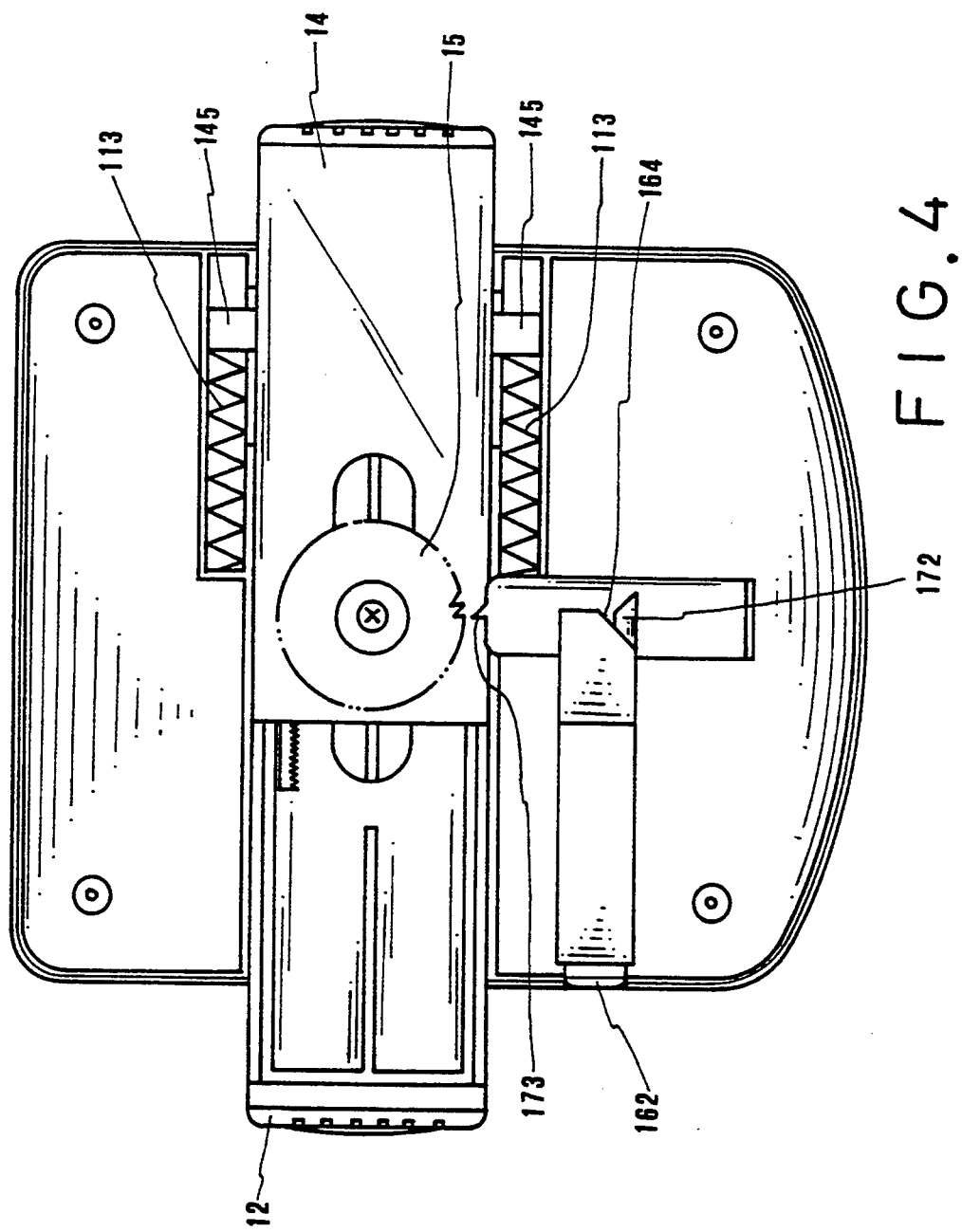
FIG. 4 is similar to FIG. 3 but showing the compression spring released, and the clamping plates moved apart.

Referring to FIGS. 3 and 4, pressing the finger strip 162 of the stop bar 16 inwards causes the brake bar 17 to move backwards in releasing the pawl 173 from the ratchet 15. At the same time, the compression springs 113 are released to push the wings 145 outwards, causing the transmission gear 13 to rotate, and therefore the first and second clamping plates 12;14 are moved in the reversed directions for allowing the things that are retained on the clamping table between the end blocks 121;141 of the first and second clamping plates 12;14 to be taken out of the clamping table. When it is desired to close the clamping table again, the end blocks 121;141 of the first and second clamping plates 12;14 are moved toward each other causing the ratchet 15 to rotate clockwise. As the push force is released from the end blocks 121;141, the ratchet 15 is immediately stopped by the pawl 173, and therefore the first and second clamping plates 12;14 are retained in position to clamp things between the end blocks 121;141. Pushing the finger strip 162 again causes the first and second clamping plates 12;14 to move apart. Therefore, the clamping pitch between the end blocks 121;141 can be conveniently adjusted.

While only one embodiment of the present invention has been shown and described, it will be understood that various modifications and changes could be made without departing from the spirit and scope of the invention.

What is claimed is:

1. A clamping table comprising:

a top shell made of flat shape, said top shell comprising a vertical flange raised around the border thereof, two parallel spring chambers, two first spring means respectively disposed in either spring chamber, a sliding seat formed between said two parallel spring chambers, a first trough and a second trough disposed at one side at right angles, a center shaft, and a plurality of internally threaded mounting rods;

a first clamping plate made to slide on said top shell at one side in a middle thereof, said first clamping plate comprising an end block perpendicularly disposed at one end thereof outside said top shell, an oblong slot near an opposite end thereof, through which said center shaft of said top shell passes, a rack and an elongated rail longitudinally disposed at two opposite sides by the oblong slot thereof;

a second clamping plate made to slide on said top shell at a side in a middle thereof opposite to said first clamping plate and in a reverse direction thereto, said second clamping plate comprising an end block perpendicularly disposed at one end thereof outside said top shell, an oblong slot near an opposite end thereof, two parallel rails respectively and bilaterally stopped against the rack and rail of said first clamping plate on the outside, a rack longitudinally disposed at one side by the oblong slot thereof within the parallel rails thereof, and two side wings mounted on said sliding seat of said top shell and respectively stopped against said first spring means at one end;

a transmission gear mounted on said center shaft of said top shell and meshed between the rack of said first clamping plate and the rack of said second clamping plate, said transmission gear having a gear shaft inserted through the oblong slot on said second clamping plate;

a ratchet mounted on the gear shaft of said transmission gear and having a set of teeth sloping in one direction;

a stop bar received in said second trough, said stop bar having a rear end terminated to a finger strip extended out of said top shell and an opposite end terminated to a projecting strip with a chamfered edge;

a second spring means received in said second trough and stopped between said stop bar and a wall of said second trough;

a brake bar received in said first trough, said brake bar comprising a stop wedge stopped against the chamfered edge of said projecting strip of said stop bar, and a pawl engaged into the teeth of said ratchet;

a third spring means received in said first trough and stopped between said brake bar and a wall of said first trough to push said brake bar toward said stop bar;

a bottom shell covered on said top shell over said first and second clamping plates, said bottom shell comprising a plurality of mounting holes respectively connected to said internally threaded mounting rods of said top shell;

a bottom plate comprising a plurality of mounting holes respectively connected to the mounting holes on said bottom shell and the internally threaded mounting rods of said top shell by screws;

a plurality of fourth spring means retained between said bottom plate and said bottom shell to absorb shocks; and wherein when said finger strip of said stop bar is pressed inwards, the pawl of said brake bar is released from said ratchet, and said side wings of said second clamping plate are pushed by said first spring means to turn said transmission gear via the rack of said second clamping plate, causing said first and second clamping plates to move apart from each other in opposite directions thereby extending the pitch between the end blocks of said first and second clamping plates; then moving the end blocks of said first and second clamping plates toward each other causes said ratchet rotated over said pawl and then immediately stopped in position by said pawl as the push force is released from the end blocks of said first and second clamping plates.

2. The clamping table of claim 1 further comprising a resilient stand having a top support fastened to said bottom plate at the bottom and a bottom mount for mounting inside a motor vehicle.

* * * * *